(12) United States Patent  (10) Patent No.: US 7,200,967 B1
Seaman et al.  (45) Date of Patent: Apr. 10, 2007

(54) DEVICE FOR INSERTION INTO AN EXISTING BEVERAGE HOLDER OPENING IN A BOAT AND RECEIVING AND SUPPORTING A HANDLE OF ANY LENGTH OF A FISHING ROD

(76) Inventors: Janice Seaman, 5307 Nautilis Dr., Cape Coral, FL (US) 33904; Allen Seaman, 5307 Nautilis Dr., Cape Coral, FL (US) 33904

( * ) Notice: Subject to any disclaimer, the term of this patent is extended or adjusted under 35 U.S.C. 154(b) by 108 days.

(21) Appl. No.: 11/087,045

(22) Filed: Mar. 22, 2005

(51) Int. Cl.
  *A01K 97/10* (2006.01)
(52) U.S. Cl. .................. 43/21.2; 248/538; 248/539
(58) Field of Classification Search ............. 43/21.2; 248/511, 512, 538, 539
  See application file for complete search history.

(56) References Cited

U.S. PATENT DOCUMENTS

| | | | | |
|---|---|---|---|---|
| 2,033,007 A | * | 3/1936 | Raithel | 248/538 |
| 2,719,687 A | * | 10/1955 | Hiscock | 248/539 |
| 4,375,731 A | * | 3/1983 | Budd | 43/21.2 |
| 4,578,891 A | * | 4/1986 | Murray | 43/21.2 |
| 4,682,438 A | * | 7/1987 | Arrow | 43/21.2 |
| 4,749,162 A | | 6/1988 | Wanzor | |
| 4,778,141 A | * | 10/1988 | Bogar | 248/538 |
| 4,836,127 A | * | 6/1989 | Wille | 114/343 |
| 4,887,375 A | * | 12/1989 | Shedd et al. | 43/21.2 |
| 4,919,316 A | * | 4/1990 | Grauberger | 224/406 |
| 5,054,738 A | | 10/1991 | Harding | |
| 5,065,540 A | * | 11/1991 | Potter, Jr. | 43/21.2 |
| 5,070,638 A | * | 12/1991 | Tregaskis | 43/15 |
| 5,163,244 A | * | 11/1992 | Rupp | 43/21.2 |
| 5,301,451 A | * | 4/1994 | VanAssche | 43/27.4 |
| 5,921,014 A | * | 7/1999 | Lee | 43/21.2 |
| 6,089,524 A | * | 7/2000 | Lai | 248/535 |
| 6,530,170 B1 | * | 3/2003 | Sweeney | 43/21.2 |
| 6,626,409 B1 | * | 9/2003 | Thompson | 248/539 |
| 6,643,974 B2 | * | 11/2003 | Ruiz et al. | 43/21.2 |
| 6,993,865 B2 | * | 2/2006 | Peters et al. | 43/21.2 |
| 2005/0102881 A1 | * | 5/2005 | Legendziewicz | 43/21.2 |
| 2006/0064920 A1 | * | 3/2006 | Wilcox et al. | 43/21.2 |

* cited by examiner

*Primary Examiner*—Kurt Rowan

(57) ABSTRACT

A device for insertion into an existing beverage holder opening in a boat and receiving and supporting a handle of any length of a fishing rod. The device includes a cup and a tube. The cup is inserted into the existing beverage holder opening in the boat. The tube extends into, and upwardly, at an angle from, the cup, receives and supports the handle of the fishing rod, and has a bottom that is open so as to allow the handle of any length of the fishing rod to pass therethrough and be received and supported by the tube.

8 Claims, 3 Drawing Sheets

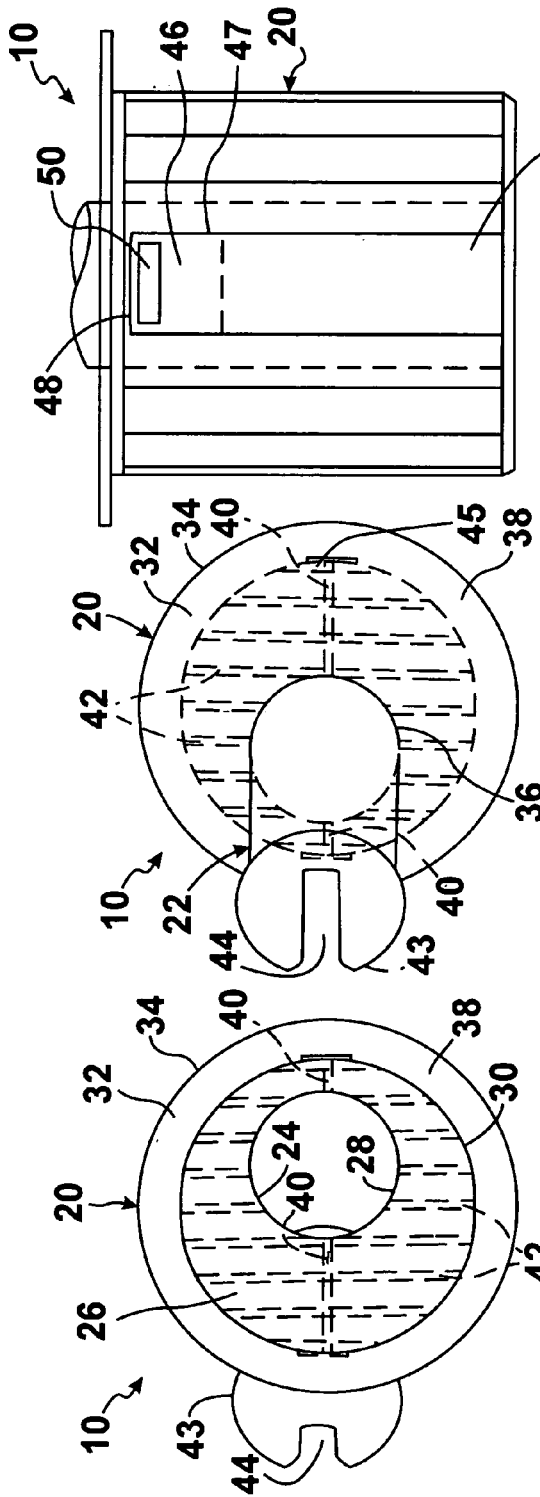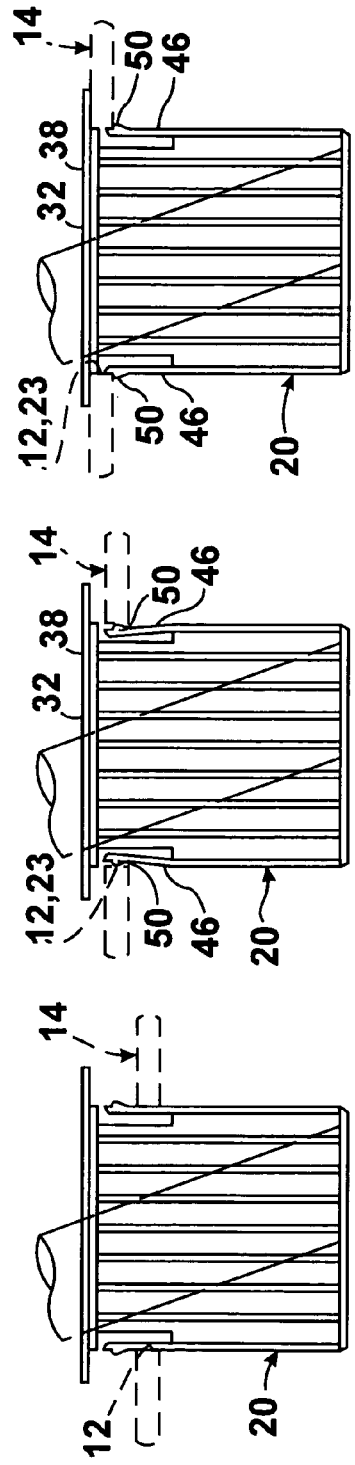

DEVICE FOR INSERTION INTO AN EXISTING BEVERAGE HOLDER OPENING IN A BOAT AND RECEIVING AND SUPPORTING A HANDLE OF ANY LENGTH OF A FISHING ROD

BACKGROUND OF THE INVENTION

1. Field of the Invention

The present invention relates to device for holding a fishing rod, and more particularly, the present invention relates to a device for insertion into an existing beverage holder opening in a boat and receiving and supporting a handle of any length of a fishing rod.

2. Brief Description of the Prior Art

U.S. Pat. No. 4,375,731 issued to Budd on Mar. 8, 1983 teaches an adapter for a fishing rod holder for pivoting the butt end of a fishing rod handle into the central portion of a socket assembly forming a portion of the rod holder to facilitate registry of one of a pair of perpendicularly arranged grooves in the butt end of the fishing rod handle with a transverse pin in the bottom end of the socket assembly to preclude rotational movement of the fishing rod about its longitudinal axis when assembled with the fishing rod holder. The adapter is in the form of a sleeve having an internal bore which flares outwardly and upwardly to guide the butt end of a fishing rod handle toward the smaller portion of the bore and centrally in the tubular member forming the socket assembly. In one embodiment of the adapter, the adapter has a continuous periphery and is machined to accurately fit into standard size socket assemblies. In another embodiment, the adapter is longitudinally split to enable slight variation in the external periphery to facilitate insertion of the adapter into the tubular member forming the socket assembly and to accommodate variations in the interior surface of the tubular member.

U.S. Pat. No. 4,749,162 to Wanzor on Jun. 7, 1988 teaches a fishing rod holder cup insert member that can hold drinks without spilling or falling over. The cup can be removed therefrom and used by itself as a regular drinking cup if so desired.

U.S. Pat. No. 4,919,316 to Grauberger on Apr. 24, 1990 teaches a fishing rod holder for insertion into an existing beverage holder opening in a boat for the purpose of receiving and supporting the handle end of a fishing rod. The fishing rod holder includes a tubular body member having a flange at its upper end and a tubular receiver secured within the body member. The handle end of the fishing rod can be inserted into and retained within the tubular receiver.

U.S. Pat. No. 5,054,738 issued to Harding on Oct. 8, 1991 teaches a utility device (10) for use by fishermen in and around fishing docks and boats which is designed to securely hold one or more fishing rods (27) along with a beverage container (30). The device (10) is of compact, integral metallic construction and includes a pair of fishing rod-receiving bodies (12) each equipped with a beverage container-engaging segment (28) rigidly secured thereto. The bodies (12) are in turn supported for releasable connection to a rail (44) or the like by means of an elongated channel (32) of inverted, U-shaped configuration.

SUMMARY OF THE INVENTION

Accordingly, an object of the present invention is to provide a device for insertion into an existing beverage holder opening in a boat and receiving and supporting a handle of any length of a fishing rod that avoids the disadvantages of the prior art.

Another object of the present invention is to provide a device for insertion into an existing beverage holder opening in a boat and receiving and supporting a handle of any length of a fishing rod that is simple to use.

Briefly stated, still another OBJECT of the present invention is to provide a device for insertion into an existing beverage holder opening in a boat and receiving and supporting a handle of any length of a fishing rod. The device includes a cup and a tube. The cup is inserted into the existing beverage holder opening in the boat. The tube extends into, and upwardly, at an angle from, the cup, receives and supports the handle of the fishing rod, and has a bottom that is open so as to allow the handle of any length of the fishing rod to pass therethrough and be received and supported by the tube.

BRIEF DESCRIPTION OF THE DRAWING

The figures of the drawing are briefly described as follows:

FIG. 3 is a diagrammatic bottom plan view taken generally in the direction of ARROW 3 in FIG. 2;

FIG. 4 is a diagrammatic top plan view taken generally in the direction of ARROW 4 in FIG. 2;

FIG. 5 is an enlarged diagrammatic side elevational view taken generally in the direction of ARROW 3 in FIG. 2 of a resilient securing tab of the device of the present invention;

FIG. 6 is an enlarged diagrammatic side elevational view of the area generally enclosed by the dotted curve identified by ARROW 4 in FIG. 2 of the device of the present invention being inserted into the existing beverage holder opening in the boat;

FIG. 7 is an enlarged diagrammatic side elevational view of the area generally enclosed by the dotted curve identified by ARROW 5 in FIG. 2 of the device of the present invention inserted into the existing beverage holder opening in the boat, with the resilient securing tabs bending back upon contact with the perimeter of the existing beverage holder opening in the boat; and FIG. 8 is an enlarged diagrammatic side elevational view of the area generally enclosed by the dotted curve identified by ARROW 6 in FIG. 2 of the device of the present invention inserted into the existing beverage holder opening in the boat, with the resilient securing tabs passing the perimeter of the existing beverage holder opening in the boat and being released, thereby replaceably securing the device of the present invention in the existing beverage holder opening in the boat.

Figure 1:
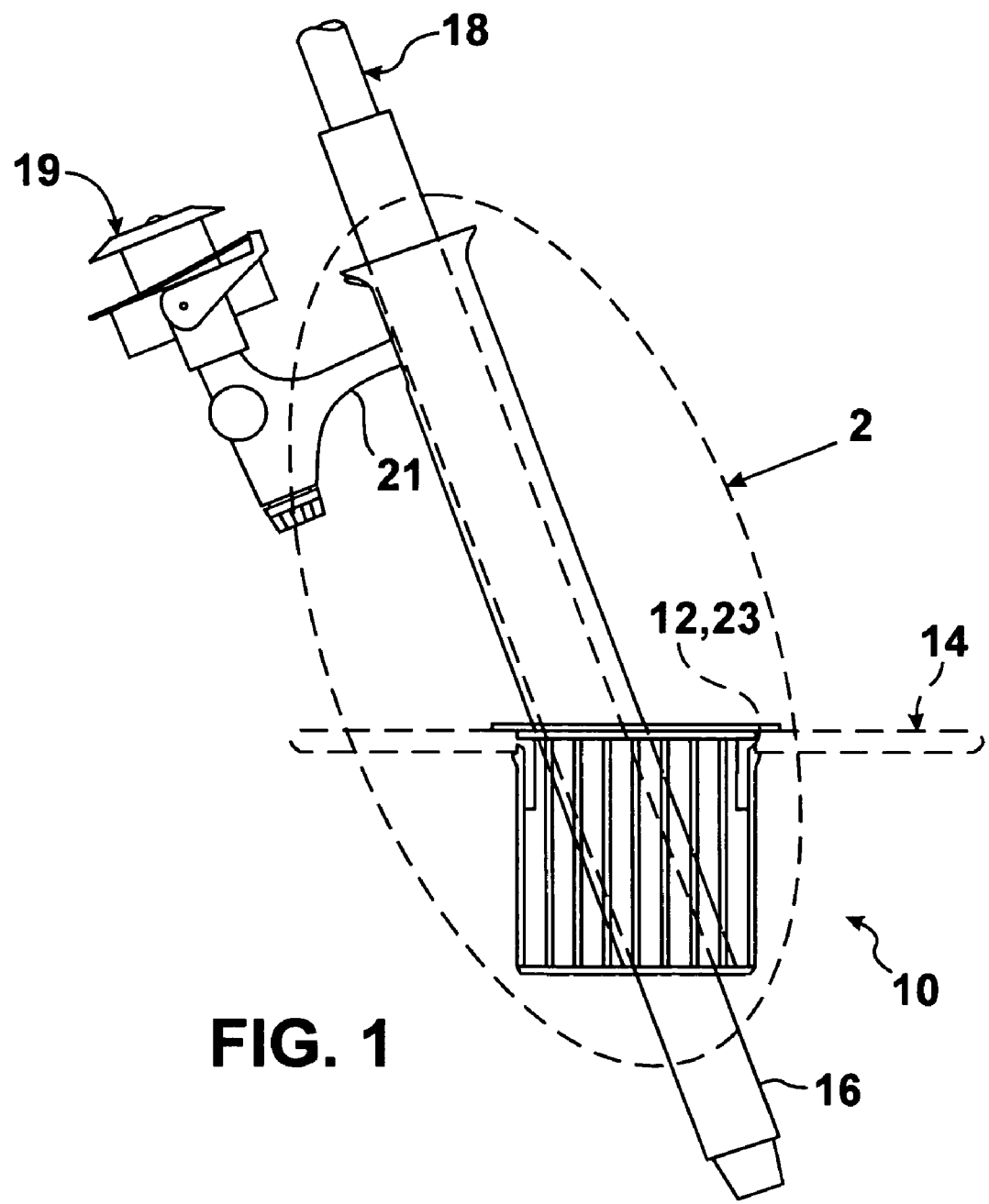
FIG. 1 is a diagrammatic side elevational view of the device of the present invention inserted into an existing beverage holder opening in a boat and receiving and supporting a handle of any length of a fishing rod.

List of Reference Numerals Utilized in the Drawing 10 device of present invention for insertion into existing beverage holder opening 12 in boat 14 and receiving and supporting handle 16 of any length of fishing rod 18

12 existing beverage holder opening 12 in boat 14

14 boat
16 handle of fishing rod 18
18 fishing rod
19 reel of handle 16 of fishing rod 18
21 foot of reel 19 of handle 16 of fishing rod 18
23 perimeter of existing beverage holder opening 12 in boat 14
20 cup for insertion into existing beverage holder opening 12 in boat 14
22 tube for receiving and supporting handle 16 of fishing rod 18
24 bottom of tube 22 for allowing handle 16 of any length of fishing rod 18 to pass therethrough and be received and supported by tube 22
26 bottom of cup 20
28 bore in bottom 26 of cup 20 for allowing handle 16 of any length of fishing rod 18 to pass therethrough and be received and supported by tube 22
30 perimeter of bottom 26 of cup 20
32 top of cup 20
34 perimeter of top 32 of cup 20
36 bore in top 32 of cup 20
38 peripheral flange of top 32 of cup 20 for providing stop when device 10 is inserted into existing beverage holder opening 12 in boat 14
40 pair of first fins of cup 20
42 plurality of second fins of cup 20
45 pair of outermost second fins of plurality of second fins 42 of cup 20
47 uppermost terminal portions of pair of outermost second fins 45 of plurality of second fins 42 of cup 20
43 top of tube 22 for facilitating insertion of handle 16 of fishing rod 18 into tube 22
44 slot in tube 22 for reception of foot 21 of reel 19 on handle 16 of fishing rod 18 when handle 16 of fishing rod 18 is inserted into tube 22
46 pair of resilient securing tabs of cup 20 for releasably securing device 10 into existing beverage holder opening 12 in boat 14
48 top of each resilient securing tab of pair of resilient securing tabs 46 of cup 20
50 ramp of each resilient securing tab of pair of resilient securing tabs 46 of cup 20 for facilitating compression of associated resilient securing tab 46 of cup 20 when engaging existing beverage holder opening 12 in boat 14 during insertion of device 10 thereinto

DETAILED DESCRIPTION OF THE PREFERRED EMBODIMENT

Referring now to the figures, in which like numerals indicate like parts, and particularly to FIG. 1, which is a diagrammatic side elevational view of the device of the present invention inserted into an existing beverage holder opening in a boat and receiving and supporting a handle of any length of a fishing rod, the device of the present invention is shown generally at 10 for insertion into an existing beverage holder opening 12 in a boat 14 and receiving and supporting a handle 16 of any length of a fishing rod 18, wherein the handle 16 of the fishing rod 18 has a reel 19 thereon with a foot 21, and wherein the existing beverage holder opening 12 in the boat 14 is defined by a perimeter 23.

The configuration of the device 10 can best be seen in FIGS. 2–4, which are, respectively, an enlarged diagrammatic side elevational view of the area generally enclosed by the dotted curve identified by ARROW 2 in FIG. 1 of the device of the present invention, a diagrammatic bottom plan view taken generally in the direction of ARROW 3 in FIG. 2, and a diagrammatic top plan view taken generally in the direction of ARROW 4 in FIG. 2, and as such, will be discussed with reference thereto.

The device 10 comprises a cup 20 and a tube 22. The cup 20 is for insertion into the existing beverage holder opening 12 in the boat 14. The tube 22 extends into, and upwardly, at an angle from, the cup 20, and is for receiving and supporting the handle 16 of the fishing rod 18. The tube 22 has a bottom 24 that is open for allowing the handle 16 of any length of the fishing rod 18 to pass therethrough and be received and supported by the tube 22.

The cup 20 is generally cylindrically-shaped and has a bottom 26. The bottom 26 of the cup 20 is generally disk-shaped and has a bore 28 therethrough. The bore 28 in the bottom 26 of the cup 20 is generally circular-shaped and coincident with the bottom 24 of the tube 22 for allowing the handle 16 of any length of the fishing rod 18 to pass therethrough and be received and supported by the tube 22.

The bottom 26 of the cup 20 further has a perimeter 30. The bore 28 in the bottom 26 of the cup 20 is disposed adjacent to the perimeter 30 of the bottom 26 of the cup 30.

The cup 20 further has a top 32. The top 32 of the cup 20 is generally disk-shaped, is disposed coaxially above, and parallel to, the bottom 26 of the cup 20, is connected thereto by the tube 22, and has a perimeter 34 and a bore 36. The bore 36 in the top 32 of the cup 20 is generally circular-shaped and disposed adjacent to the perimeter 34 of the top 32 of the cup 30, diametrically opposite to the bore 28 in the bottom 26 of the cup 20.

The bore 28 in the bottom 26 of the cup 20 being disposed adjacent to the perimeter 30 of the bottom 26 of the cup 30 and the bore 36 in the top 32 of the cup 20 being disposed adjacent to the perimeter 34 of the top 32 of the cup 30, diametrically opposite to the bore 28 in the bottom 26 of the cup 20, allow the tube 22 to extend into, and upwardly, at an angle from the cup 20.

The top 32 of the cup 20 is wider than the bottom 26 of the cup 20 so as to allow the periphery 34 thereof to form a peripheral flange 38 for providing a stop when the device 10 is inserted into the existing beverage holder opening 12 in the boat 14.

The top 32 of the cup 20 is further connected to the bottom 26 of the cup 20 by a pair of first fins 40. The pair of first fins 40 of the cup 20 are flat, collinear, and extend radially outwardly from both sides of the tube 22.

The top 32 of the cup 20 is further connected to the bottom 26 of the cup 20 by a plurality of second fins 42. The plurality of second fins 42 of the cup 20 have a pair of outermost second fins 45 with uppermost terminal portions 47, are flat, are parallel to each other, are spaced-apart from each other, and extend along chords of the cup 20 from both sides of the tube 22 and the pair of first fins 40 of the cup 20 and to which they are perpendicular to.

The pair of first fins 40 of the cup 20 and the plurality of second fins 42 provide structural rigidity to the cup 20 while saving weight.

The tube 22 further has a top 43. The top 43 of the tube 22 is flared for facilitating insertion of the handle 16 of the fishing rod 18 into the tube 22.

The tube 22 further has a slot 44. The slot 44 in the tube 22 extends axially therealong from, and communicates with, the top 42 of the tube 22 for reception of the foot 21 of the reel 19 on the handle 16 of the fishing rod 18 when the handle 16 of the fishing rod 18 is inserted into the tube 22.

The cup 20 further has a pair of resilient securing tabs 46. The pair of resilient securing tabs 46 of the cup 20 are disposed on the pair of outermost second fins 43 of the cup 20 and are for releasably securing the device 10 into the existing beverage holder opening 12 in the boat 14.

The specific configuration of the pair of resilient securing tabs 46 of the cup 20 can best be seen in FIG. 5, which is an enlarged diagrammatic side elevational view taken generally in the direction of ARROW 3 in FIG. 2 of a resilient securing tab of the device of the present invention, and as such, will be discussed with reference thereto.

The pair of resilient securing tabs 46 of the cup 20 are formed from the uppermost terminal portions 47 of the pair of outermost second fins 45 of the plurality of second fins 42 of the cup 20 being free of the pair of first fins 40 of the cup 20 and the top 32 of the cup 20.

Each resilient securing tab 46 of the cup 20 has a top 48 and a ramp 50. The ramp 50 of each resilient securing tab 46 of the cup 20 extends laterally therealong, just below the top 48 thereof, and is for facilitating compression of an associated resilient securing tab 46 of the cup 20 when engaging the existing beverage holder opening 12 in the boat 14 during insertion of the device 10 thereinto.

Figure 2:
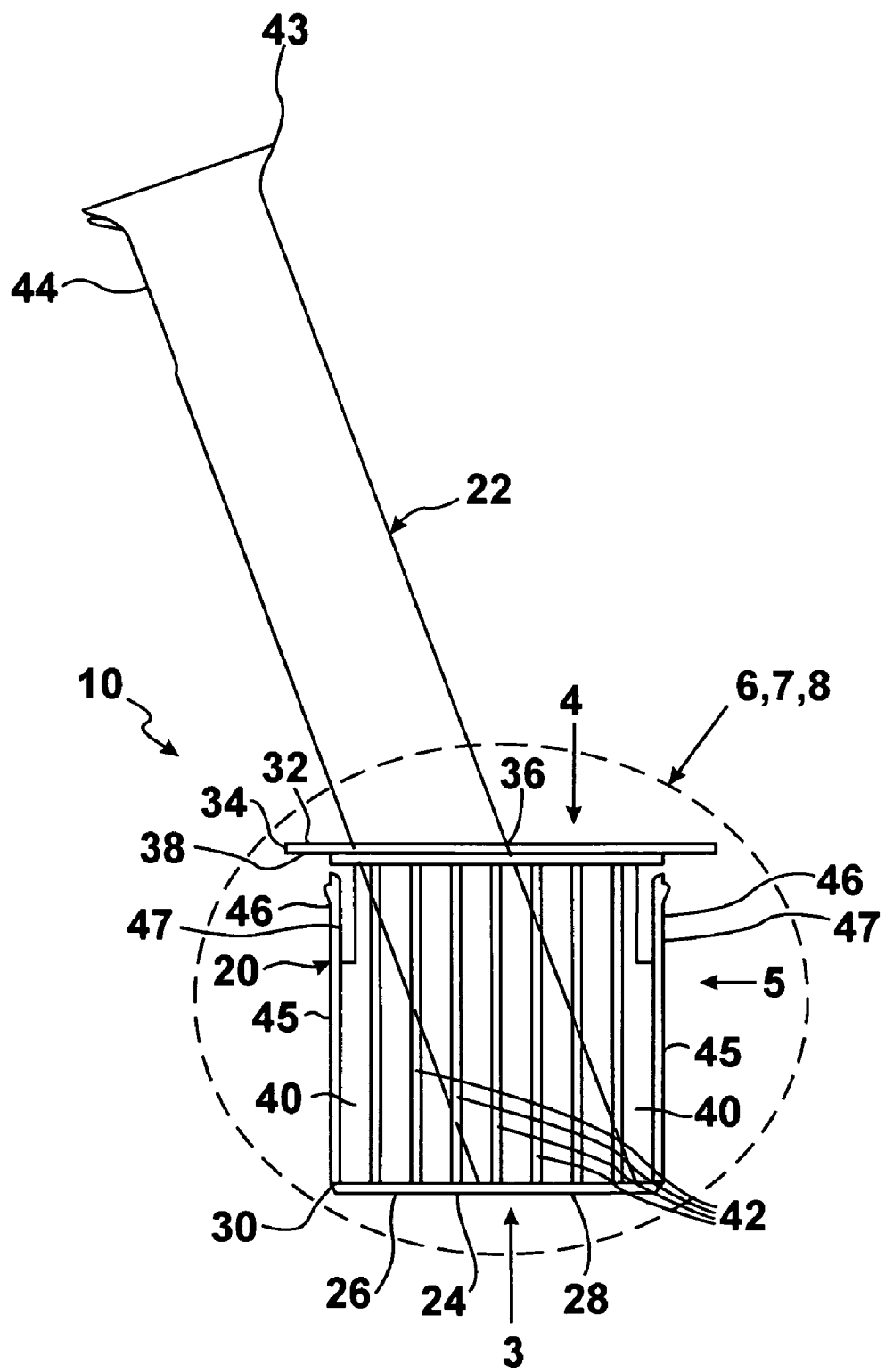
FIG. 2 is an enlarged diagrammatic side elevational view of the area generally enclosed by the dotted curve identified by ARROW 2 in FIG. 1 of the device of the present invention.

The method of utilizing the device 10 can best be seen in FIGS. 6–8, which are, respectively, an enlarged diagrammatic side elevational view of the area generally enclosed by the dotted curve identified by ARROW 4 in FIG. 2 of the device of the present invention being inserted into the existing beverage holder opening in the boat, an enlarged diagrammatic side elevational view of the area generally enclosed by the dotted curve identified by ARROW 5 in FIG. 2 of the device of the present invention inserted into the existing beverage holder opening in the boat, with the resilient securing tabs bending back upon contact with the perimeter of the existing beverage holder opening in the boat, and an enlarged diagrammatic side elevational view of the area generally enclosed by the dotted curve identified by ARROW 6 in FIG. 2 of the device of the present invention inserted into the existing beverage holder opening in the boat, with the resilient securing tabs passing the perimeter of the existing beverage holder opening in the boat and being released, thereby replaceably securing the device of the present invention in the existing beverage holder opening in the boat, and as such, will be discussed with reference thereto.

STEP 1: As shown in FIG. 6, insert the cup 20 into the existing beverage holder opening 12 in the boat 14.

STEP 2: As shown in FIG. 7, continue to insert the cup 20 into the existing beverage holder opening 12 in the boat 14 and engage the ramps 50 of the pair of resilient securing tabs 46 of the cup 20 with the perimeter 23 of the existing beverage holder opening 12 in the boat 14 causing the pair of resilient securing tabs 46 of the cup 20 to compress.

STEP 3: As shown in FIG. 8, continue to insert the cup 20 into the existing beverage holder opening 12 in the boat 14 past engagement of the ramps 50 of the pair of resilient securing tabs 46 of the cup 20 with the perimeter 23 of the existing beverage holder opening 12 in the boat 14 causing the pair of resilient securing tabs 46 of the cup 20 to decompress and releasably trap the perimeter 23 of the existing beverage holder opening 12 in the boat 14 between the peripheral flange 38 of the top 32 of the cup 20 and the ramps 50 of the pair of resilient securing tabs 46 of the cup 20.

The invention claimed is:

1. A device for insertion into an existing beverage holder opening in a boat and receiving and supporting a handle of any length of a fishing rod, wherein the handle of the fishing rod has a reel thereon with a foot, and wherein the existing beverage holder opening in the boat is defined by a perimeter, said device comprising:
   a) a cup; and
   b) a tube;
   wherein said cup is for insertion into the existing beverage holder opening in the boat;
   wherein said tube extends into, and upwardly, at an angle from, said cup; wherein said tube is for receiving and supporting the handle of the fishing rod; wherein said tube has a bottom;
   wherein said bottom of said tube is open for allowing the handle of any length of the fishing rod to pass therethrough and be received and supported by said tube;
   wherein said cup has a bottom;
   wherein said bottom of said cup has a bore therethrough;
   wherein said bore in said bottom of said cup is coincident with said bottom of said tube for allowing the handle of any length of the fishing rod to pass therethrough and be received and supported by said tube;
   wherein said bottom of said cup has a perimeter;
   wherein said bore in said bottom of said cup is disposed adjacent to said perimeter of said bottom of said cup;
   wherein said cup has a top;
   wherein said top of said cup is disposed generally coaxially above said bottom of said cup;
   wherein said top of said cup is connected to said bottom of said cup by said tube;
   wherein said top of said cup has a perimeter;
   wherein said top of said cup has a bore;
   wherein said bore in said top of said cup is disposed adjacent to said perimeter of said top of said cup;
   wherein said bore in said top of said cup is diametrically opposite to said bore in said bottom of said cup;
   wherein said top of said cup is connected to said bottom of said cup by a pair of first fins;
   wherein said pair of first fins of said cup extend generally radially outwardly from both sides of said tube;
   wherein said top of said cup is connected to said bottom of said cup by a plurality of second fins;
   wherein said plurality of second fins of said cup extend substantially along chords of said cup from both sides of said tube and said pair of first fins of said cup;
   wherein said plurality of second fins of said cup have a pair of outermost second fins;
   wherein said pair of outermost second fins of said plurality of second fins of said cup have uppermost terminal portions;
   wherein said cup has a pair of resilient securing tabs;
   wherein said pair of resilient securing tabs of said cup are disposed on said pair of outermost second fins of said cup; and
   wherein said pair of resilient securing tabs of said cup are for releasably securing said device into the existing beverage holder opening in the boat.

2. The device as defined in claim 1, wherein said bore in said bottom of said cup being disposed adjacent to said perimeter of said bottom of said cup and said bore in said top of said cup being disposed adjacent to said perimeter of said top of said cup, diametrically opposite to said bore in said bottom of said cup, allow said tube to extend into, and upwardly, at an angle from said cup.

3. The device as defined in claim 1, wherein said top of said cup is wider than said bottom of said cup so as to allow said periphery thereof to form a peripheral flange for providing a stop when said device is inserted into the existing beverage holder opening in the boat.

4. The device as defined in claim 1, wherein said pair of first fins of said cup and said plurality of second fins of said cup provide structural rigidity to said cup while saving weight.

5. The device as defined in claim 1, wherein said tube has a top, and wherein said top of said tube is flared for facilitating insertion of the handle of the fishing rod into said tube.

6. The device as defined in claim 5, wherein said tube has a slot; and wherein said slot in said tube extends axially therealong from, and communicates with, said top of said tube for reception of the foot of the reel on the handle of the fishing rod when the handle of the fishing rod is inserted into said tube.

7. The device as defined in claim 1, wherein said pair of resilient securing tabs of said cup are formed from said uppermost terminal portions of said pair of outermost second fins of said plurality of second fins of said cup being free of said pair of first fins of said cup and said top of said cup.

8. The device as defined in claim 1, wherein each resilient securing tab of said cup has a top;
wherein each resilient securing tab of said cup has a ramp;
wherein said ramp of each resilient securing tab of said cup extends laterally therealong;
wherein said ramp of each resilient securing tab of said cup is disposed just below said top of an associated resilient securing tab of said cup;
wherein said ramp of each resilient securing tab of said cup is for facilitating compression of an associated resilient securing tab of said cup when engaging the existing beverage holder opening in the boat during insertion of said device thereinto.

* * * * *